SHORT WAVE ELECTROMAGNETIC RADIATION CATOPTRICS

Filed Nov. 29, 1948 4 Sheets-Sheet 1

INVENTOR.
PAUL HARMON KIRKPATRICK

BY Mellin and Hanscom

ATTORNEYS

June 19, 1951 P. H. KIRKPATRICK 2,557,662

SHORT WAVE ELECTROMAGNETIC RADIATION CATOPTRICS

Filed Nov. 29, 1948 4 Sheets-Sheet 2

INVENTOR.
PAUL HARMON KIRKPATRICK
BY Mellin and Hanscom
ATTORNEYS

SHORT WAVE ELECTROMAGNETIC RADIATION CATOPTRICS

Filed Nov. 29, 1948 4 Sheets-Sheet 3

INVENTOR.
PAUL HARMON KIRKPATRICK
BY Mellin and Hanscom
ATTORNEYS

INVENTOR.
PAUL HARMON KIRKPATRICK
BY Mellin and Hanscom
ATTORNEYS

Patented June 19, 1951 2,557,662

UNITED STATES PATENT OFFICE 2,557,662

SHORT-WAVE ELECTROMAGNETIC RADIATION CATOPTRICS

Paul Harmon Kirkpatrick, Palo Alto, Calif., assignor to Research Corporation, Santa Monica, Calif., a corporation of New York Application November 29, 1948, Serial No. 62,452

4 Claims. (Cl. 250—53)

This invention relates to short wave electromagnetic radiation catoptrics and in general has for its object the provision of optical systems for the formation of short wave electromagnetic radiation optical images.

Although it is well known that short wave electromagnetic radiation such as X-rays will reflect from certain surfaces at grazing incidence, the resulting severe aberration and other image defects have apparently discouraged others from attempting to develop an X-ray microscope in spite of the advantages of such an instrument over optical and electronic microscopes. Optical microscopes have a limited field of use because of their restricted resolution, and the field of use of electronic microscopes is restricted by reason of the limited penetrating power of electrons. X-ray microscopes such as herein contemplated and which are free of the limitations above referred to should therefore open up entirely new fields of investigation closed to both optical and electronic microscopes.

More specifically the object of this invention is the provision of short wave electromagnetic radiation optical systems of various forms involving the use of one or more curved reflecting surfaces and by which the convergence of a bundle of rays can be changed to produce a line image of a point source, a point image of a point source, and perforce images of two- and three-dimensional objects.

The invention possesses other advantageous features, some of which, with the foregoing, will be set forth at length in the following description where those forms of the invention which have been selected for illustration in the drawings accompanying and forming a part of the present specification are outlined in full.

In said drawings, several forms of the invention are shown, but it is to be understood that it is not limited to such forms, since the invention as set forth in the claims may be embodied in a plurality of forms.

Although the reflecting systems herein described are applicable to the formation of images by the use of electromagnetic radiation of a wave-length shorter than that of light, such as X-rays and $\gamma$-rays, for purposes of illustration the following description is made with particular reference to X-rays.

Referring to the drawings:

Fig. 1*a* is a schematic digram in side elevation of an X-ray reflecting system wherein a bundle of X-rays from a point source is reflected at grazing incidence from a plane reflecting surface to form a rectangular image on a screen.

Fig. 1*b* is a schematic right-hand end view of the system shown in Fig. 1*a*.

Fig. 2*a* is a schematic side elevation of an optical X-ray reflecting system embodying the objects of my invention and wherein a single mirror of circular cylindrical shape is resorted to for producing a line image of a point source of X-rays.

Fig. 2*b* is a schematic right-hand end elevation of the system illustrated in Fig. 2*a*.

*Reflections from plane mirror*

Preliminarily it should be observed that X-rays, aside from the fact that they can be reflected only at grazing incidence, can be thought of in terms of ordinary light in so far as the geometrical properties of reflectors are concerned.

Figure 1A:
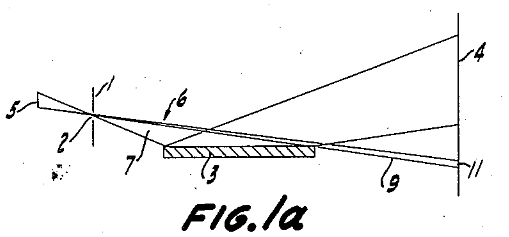
Figure 1B:
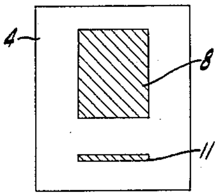

To illustrate this point reference is had to Figs. 1*a* and 1*b* showing an X-ray reflecting system including an X-ray shield 1 provided with a pinhole or window 2, a plane or flat rectangular mirror 3, an X-ray film 4, and a source 5 (target of X-ray tube) of X-rays located behind the shield 1. Radiated from the source 5 and passing through the window 2 which in effect serves as a point object, is a diverging bundle of X-rays generally designated by the reference numeral 6. The lower and major portion 7 of this bundle has grazing incidence with the mirror 3 and is reflected thereby to the film 4 as a rectangular pattern 8. The upper and smaller portion 9 of the bundle of X-rays radiated from the lower end of the target 5 entirely clears the mirror and is intercepted by the film in a narrow band pattern 11. From this illustration it is also apparent that a system of this kind wherein a plane mirror is used, can not be resorted to for the purpose of focusing or changing the divergence of a bundle of X-rays.

*Reflections from concave mirror*

Figure 2A:
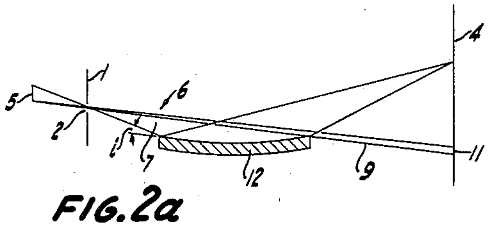
Figure 2B:
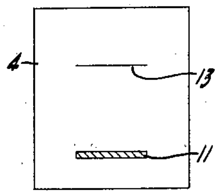

If, however, in accordance with the objects of my invention and as illustrated in Figs. 2*a* and 2*b*, a concave mirror 12 of conic section form is substituted for the plane mirror 3 of Figs. 1*a* and 1*b*, the point object constituted by the window 2 can be imaged on the photographic film or other X-ray detector as a line image 13. It should here be noted that since the elements of the system illustrated in Figs. 2*a* and 2*b* other than the mirror 12 are identical to the corresponding elements of the system shown in Figs. 1*a* and 1*b*, they have been indicated by like reference numerals. The angles of incidence between any ray of the bundle 6 and the mirror 12 preferably should lie within the range 0 to about $10^{-2}$ radians and $5\times10^{-3}$ radians can be taken as typical. However, since such small angles would hardly be perceptible in the various figures of the drawings they of necessity have been greatly exaggerated.

One way of producing a mirror of circular cylindrical shape of the character above described is to subject the opposite ends of a flat strip of glass provided on its upper surface with a metallic coating, to equal and opposite torques. By increasing the torque, the radius of curvature of the mirror can be progressively decreased so as to bring the line image 13 into focus. The focal length $f$ of such a mirror will be presently discussed with reference to Fig. 4.

*Single spherical mirror system*

Figures 3, 4, 5:
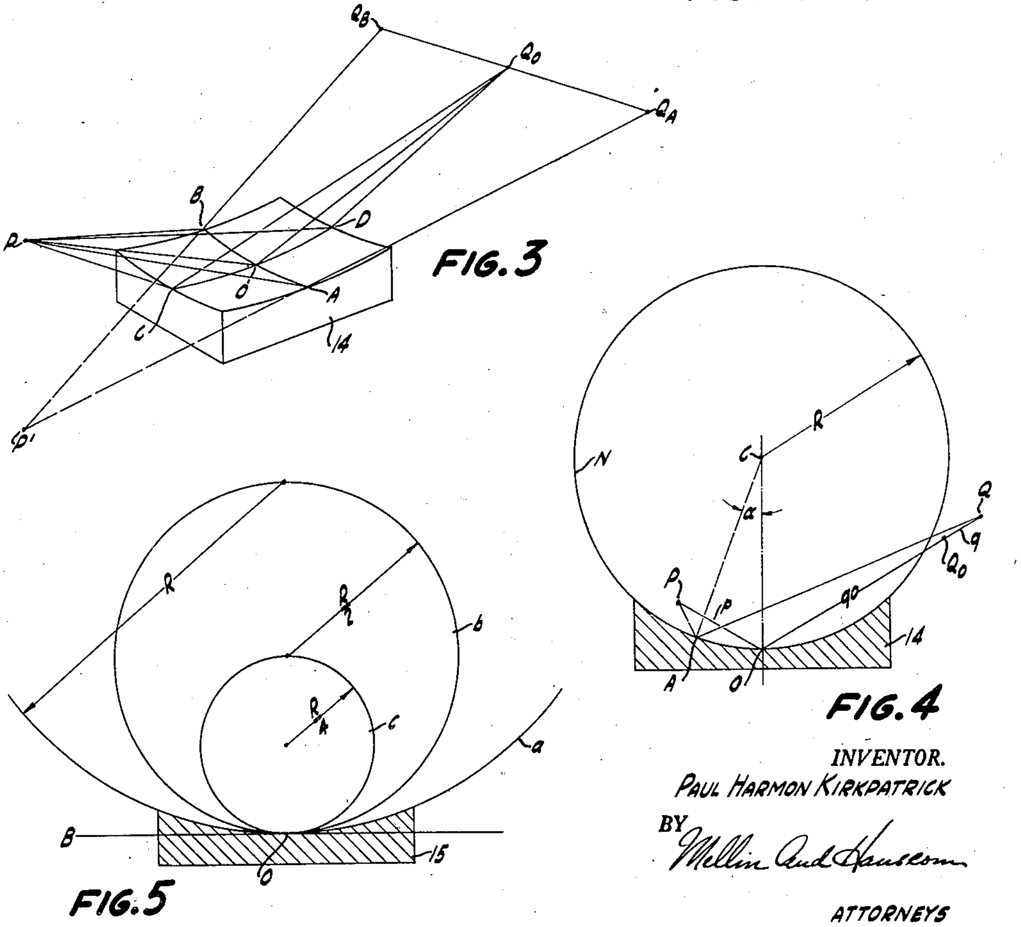
Fig. 3 is a schematic isometric diagram of a single mirror X-ray reflecting system similar to the system illustrated in Figs. 2*a* and 2*b* but wherein a spherical mirror is used rather than a mirror of circular cylindrical form.
Fig. 4 is a diagram used in deriving the equation for the focal length $f$ of circular mirrors suitable for producing X-ray images wherein the circle shown represents a plane section of a mirror the reflecting surface of which is either spherical or cylindrical.
Fig. 5 is a diagram by which the relationship between a mirror circle, Rowland circle and focal circle can be described.

As shown in Fig. 3, a spherical mirror 14 can be substituted for the circular cylindrical mirror 12 used in the system illustrated in Figs. 2*a* and 2*b* and is preferable for the reason that the technique of producing spherical mirrors is well known. In Fig. 3, let P represent a point source of X-rays and conceive of CD as an arc of a great circle of the spherical mirror 14, and AB as an arc of a parallel of latitude. The normals to the sphere on C and D then lie on a common plane and let it be assumed that P is contained in this plane. Then the rays leaving P and hitting CD will be reflected approximately to a point $Q_0$, while the rays leaving P and hitting AB will diverge after reflection and seem to originate from P′ (the virtual image of P by a plane mirror tangent to the sphere at O). From this it will be seen a spherical mirror images a point object (P) as a line image $Q_AQ_0Q_B$ in the same manner as does a circular mirror. Actually $Q_AQ_0Q_B$ assumes a circular shape of negligible curvature and P′ is not precisely at the plane-mirror image of P, but very nearly so, since the radius of the spherical mirror is so large that it behaves essentially like a plane mirror in this regard. The curvature of $Q_AQ_0Q_B$ results from the fact that rays such as PA and PB and known as sagittal rays have a focus distinct from that of the meridian ray $POQ_0$ as will be presently described with reference to Fig. 4.

*Basic mirror equation*

In Fig. 4 let N represent a mirror circle of radius R and P a point source of X-rays.

Now assume that an X-ray from P passes to an arbitrary point O of the mirror (usually taken at the center of the mirror face) and let the length of this ray (principal ray) be represented by $p$. This ray is reflected according to the usual law of reflection applying to light. Another ray PA is reflected from the point A and intersects the ray reflected from the point O at the point Q. Let the distance OQ equal $q$. The basic mirror equation for a circular mirror is:

$$\frac{1}{p}+\frac{1}{q}=\frac{1}{f}=\frac{2}{R\sin i} \quad (1)$$

wherein $i$ is the angle between the incident ray and the tangent plane at the point of incidence and in accordance with this equation there will be a theoretical focus at some point $Q_0$. Let the distance $OQ_0$ equal $q_0$. The principal ray PO, and the normal CO, determine a plane. Rays such as PA and PO lying in this plane are designated as meridian rays and although only meridian rays are considered with reference to Fig. 4 it is to be noted that in discussing the reflection from spherical mirrors sagittal rays such as PA and PB of Fig. 3 must also be considered.

Equation 1 indicates that the focal length $f$ is dependent on the angle of incidence $i$. If $i$ is small (as it must be for X-ray reflection) sin $i$ may be replaced by $i$, yielding the equation:

$$f=\frac{R\sin i}{2}\cong\frac{Ri}{2} \quad (2)$$

which is an excellent approximation for $$O<i<0.01$$

Thus reflection at grazing incidence is quite different from the usual optical use of spherical mirrors at $i=90°$, in which case, sin $i=1$ and Equation 1 gives the usual mirror formula. In any case, Equation 1 is an approximate formula which improves as rays are so chosen that $a\rightarrow0$. In all X-ray work, $$f=\frac{Ri}{2}$$

is an excellent approximation of the focal length of a circular mirror.

*Mirror, Rowland and focal circles*

Preliminary to determining the focal length $f'$ of the sagittal rays reflected from a spherical mirror, refer to Fig. 5 wherein there is shown a spherical mirror 15 of radius R, its mirror circle and its associated Rowland and focal circles, and consider a system of polar co-ordinates $(r, i)$ with pole at O and a polar axis OB. The equations:

$$(3)\quad (a)\ r=2R\sin i \qquad (b)\ r=R\sin i \qquad (c)\ r=\frac{R}{2}\sin i$$

are the equations of three circles, tangent at O and of radii R, R/2, and R/4, respectively. The first, (*a*), is the mirror circle. The second, (*b*), is the circle (Rowland circle) of points for which $p=q$ as may be seen by letting $p=q$ in Equation 1. This yields $q=R\sin i$ which is like (*b*) with $q$ as a radius vector. The third, (*c*), focal circle, corresponds to the points for which $q=\infty$, for the Equation 1 becomes $$p=\frac{R}{2}\sin i$$

with $p$ as a radius vector. When a point source of X-rays is placed on the Rowland circle its image is on the same circle. When a point source of X-rays is placed on the focal circle, the reflected rays form a parallel beam (approximately).

*Second focal length $f'$ for a spherical mirror*

Figure 6:
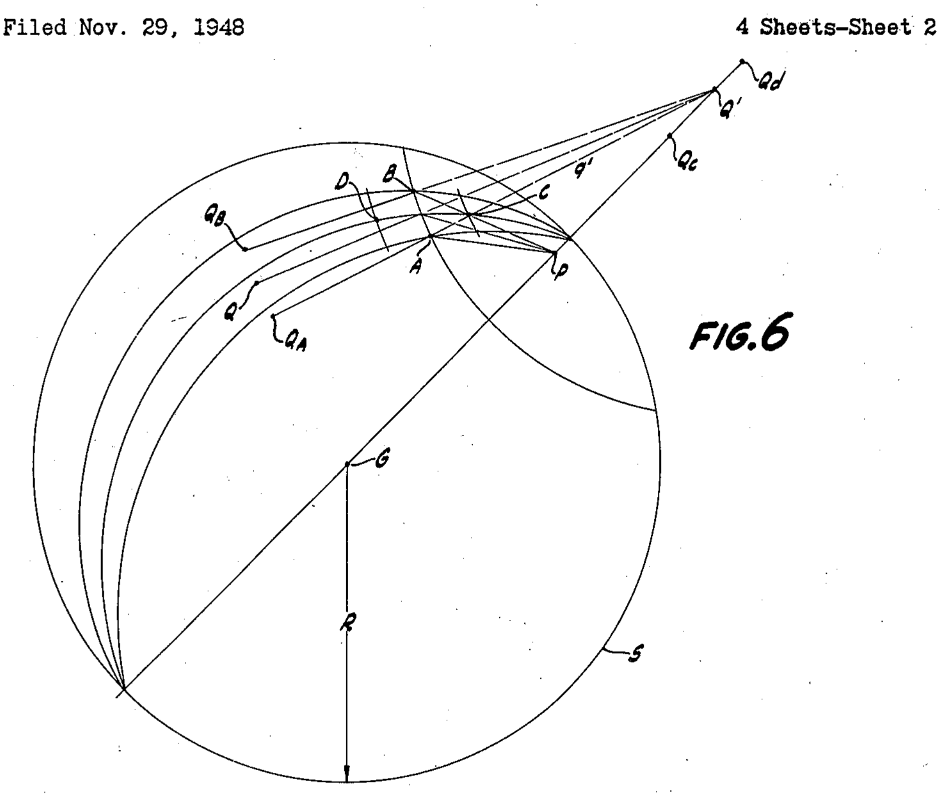
Fig. 6 is a diagram from which the equation for the focal length of the sagittal rays reflected from a spherical mirror can be derived.

With the above factors in mind and by reference to Fig. 6 it can now be shown that a spherical mirror possesses another focal length $$f'=\frac{R}{2\sin i}$$

for sagittal rays. In Fig. 6 the spherical mirror 14 (ABCD) of Fig. 3 is shown as part of a large sphere S of radius R, with its center at G. The lettering in Fig. 6 corresponds with that of Fig. 3. In Fig. 6, the entire sphere S of which the mirror ABCD is part, has been shown. To establish a co-ordinate system on the sphere, the object point P is joined to G by a straight line. This determines the axis of the sphere (analogous to the north-south axis on the earth). All great circles containing this axis as an extended diameter are meridians and all circles with planes normal to this axis are parallels of latitude. The arc AB lies on a parallel of latitude and the arc CD lies on a meridian. The bundle determined by the arc AB and the point P is called a sagittal bundle and that determined by the arc CD and P is a meridian bundle, in accordance with previous definitions herein. We are here interested only in the sagittal bundle. The ray PA is reflected in a meridian plane in the direction $AQ_A$. ($Q_A$ is the real image of P formed by a meridian bundle about A.) The ray PB is reflected in another meridian plane in the direction $BQ_B$, but since the corresponding angles involved in these planes are similar, it is easy to see that $AQ_A$ and $BQ_B$ intersect in a point Q′ which lies on the axis line GP extended. In other words, the rays leaving P in the sagittal bundle determined by BA are reflected so that they seem to come from a common point Q′. Hence Q′ is in effect a virtual image of P, and the distance $q'$ or AQ′ is given by the equation $$-\frac{1}{q'}+\frac{1}{p}=\frac{1}{f'}=\frac{2\sin i}{R}$$

(All symbols $p$, $q'$, $f'$, R, $i$ denote positive quantities.) But $$\frac{\sin i}{R}\cong 10^{-5}$$

hence $q'\cong p$. Actually if the arcs of the set of all parallels of latitude which run through my mirror are taken into consideration, the virtual image of P will spread out along a line segment $Q'_cQ'_d$ on CP in the vicinity of Q′. Figure 6 shows also that $Q_AQ_B$ is an arc of a circle (of negligible curvature if R is very large). The real image $Q_AQ_B$ and the virtual image $Q'_cQ'_d$ are at right angles to one another. The conclusion is that spherical mirrors possess two focal lengths $$f=\frac{R\sin i}{2}\text{ (focal length of meridian rays)}$$

and $$f'=\frac{R}{2\sin i}\text{ (focal length of sagittal rays)}$$

so that $$f'/f\cong i^{-2}\qquad (i<<1)$$

For the largest angles used in our work $i^{-2}\cong 10^4$, so that the ratio $f'/f$ is extremely large. Another way of making this comparison is to observe that R is the geometric mean of $$f\text{ and }f'\ (R=\sqrt{ff'})$$

The convergent (or divergent) effect of such a sagittal focal length is negligible. It is to be noted that the focal length of a plane mirror is infinite.

*Two-mirror, single X-ray reflecting system*

Figure 7:
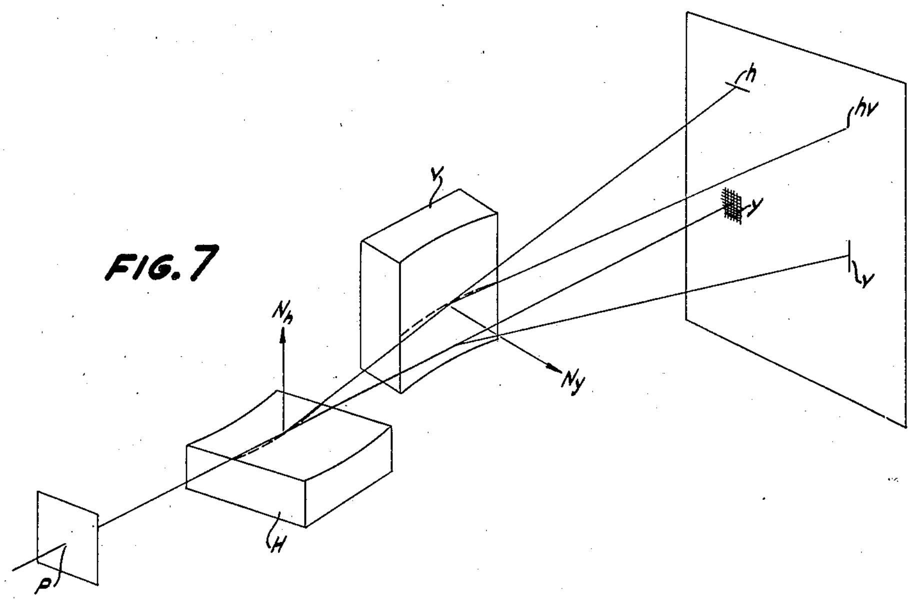
Fig. 7 is a schematic isometric diagram of a two-mirror X-ray reflecting system embodying the invention.

To image a point source as a point image rather than as a line image as above described, resort is had to the two-mirror, single X-ray reflecting system illustrated in Fig. 7. The mirrors H and V (cylindrical or spherical) are in "crossed" position, with the normals to their surfaces ($N_h$ and $N_y$) mutually perpendicular. On the film: $h$ indicates the horizontal line image of the pinhole object P reflected only from the mirror H; $v$ indicates the vertical line image of the object P reflected only from the mirror V; $hv$ indicates the point image of the object P reflected successively from both mirrors; and $y$ indicates the two-dimensional pattern formed by a bundle of rays passing directly to the film without any reflection. The $hv$ image is of course the one primarily desired and must be distinguished from the others. It should be observed that the image of P formed by the mirror H becomes the object for V, the next succeeding mirror in the system. The dash lines on each mirror merely indicate the planes containing the meridian rays. The sagittal rays on H experience practically no convergence and become the meridian rays for V. Likewise the meridian rays on H become the sagittal rays for V. In this system as well as in any other X-ray reflecting system the focal length of the mirrors used must of course conform to the equations above set forth and the angle of incidence of the reflected rays must lie within the range stated. More specifically and for purposes of illustration, an X-ray reflecting system having the following dimensions and characteristics has been found to produce satisfactory results:

(a) Two "crossed" platinum-coated spherical mirrors having a radius R of 11 m. and having a focal distance of about 5 cm.

(b) An angle of incidence $i$ with respect to each mirror of approximately 0.01 radian.

*Magnification*

Figure 8:
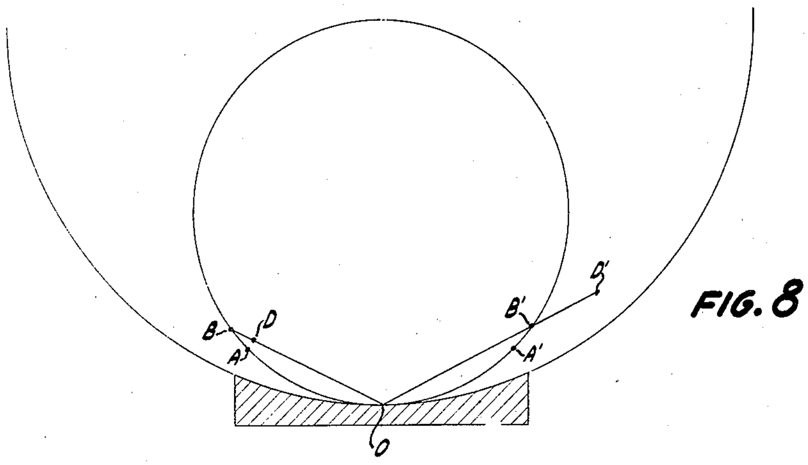
Fig. 8 is a diagram illustrating the manner in which magnified images are produced by a single X-ray reflecting system.
Figures 9, 10, 11:
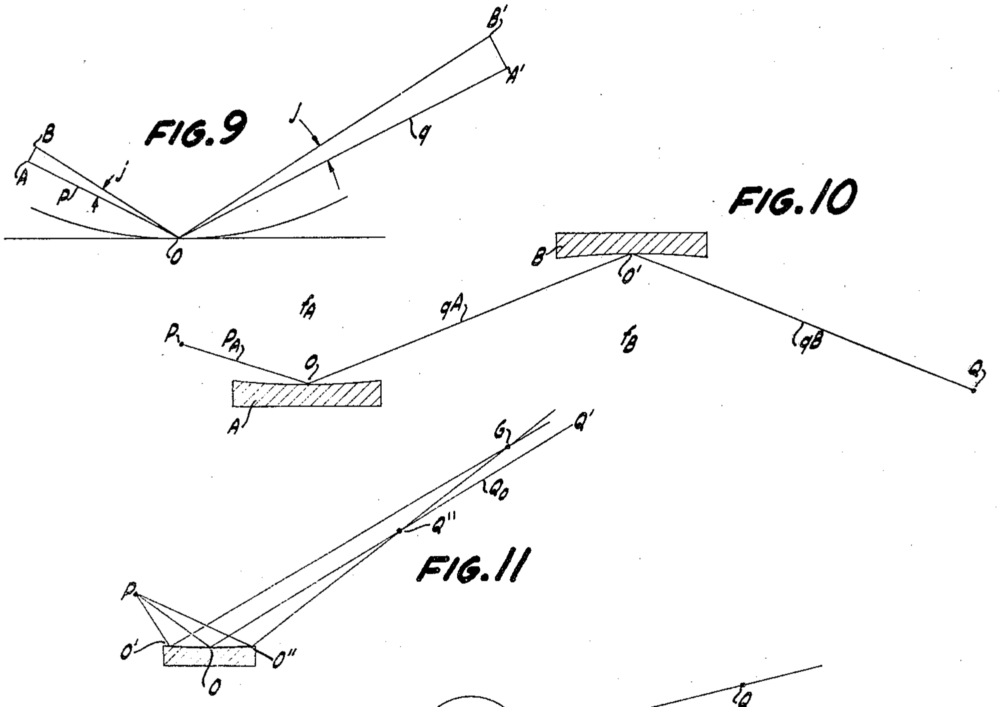
Fig. 9 is a diagram similar to and supplementing the diagram illustrated in Fig. 8.
Fig. 10 is a diagram of a two-mirror single system illustrating sharpness of focus in connection with magnified images.
Fig. 11 is a diagram supplementary to Fig. 10 to further illustrate sharpness of focus.

By using a two-mirror single system such as above described it is possible to obtain magnified images of one-, two- and three-dimensional objects. Referring to Figs. 8 and 9, first consider the case wherein $p=q$. The object and image then lie on the Rowland circle (see Fig. 5). An object of circular shape AB (Fig. 8) would produce an image of the same size (A′B′). The magnification M is unity in this case. The object "leans" back and the image "leans" forward. At first one might hope to correct this by tilting the object forward until it assumed a position normal to BO. The object AD has this property, but the image of D (viz. D′) lies beyond B′ on OB′ so that the image of AD (viz. A′D′) leans even more than did A′B′. In spite of this, when a film is placed at A', normal to OA', the rays headed for D' are in sufficiently good focus on the film to give a fairly reasonable focus of D on the film.

In connection with Fig. 9, let us assume that the object is placed in a plane normal to the incident principal ray AO of length $p$ and the film is in a plane normal to the principal reflected ray OA' of length $q$, and $q>p$. If the object AB subtends an angle $\Delta i$ at O the image A'B' must also subtend an angle $\Delta i$ at O. Hence $$\frac{A'B'}{AB}=\frac{q}{p}=M$$

That is, the magnification is given by the familiar object-distance-over-image-distance formula used in elementary optics. High magnification with a single mirror is acheved by makng $q/p$ large. A magnification of 100 would be effected if $p+q=101p$. It is convenient to keep $p$ small if the size of the apparatus is to remain of reasonable length. If the distance $p+q$ is very great, much air absorption will be encountered resulting in abnormally long photographic exposures, especially with soft X-rays. On the other hand, if the mirror is designed of short focal length, small $p$'s can be utilized but the field of view will be limited. This limiting of the field with increasing magnification is common to all enlarging systems.

*Sharpness of focus*

The sharpness of focus deteriorates with increasing magnification, being best at M=1, and getting progressively worse, but at about M=10 it is about as bad as it will be for any value of M>10.

Multiple combinations will permit large magnification with better sharpness of focus. Consider a combination consisting of two circular mirrors in the positions shown in Fig. 10.

If an object were placed at P so that $P_A=f_A$ ($f_A$ is the focal length of mirror A based on Equation 1), then the beam leaving A would be approximately parallel to OO'. If a film were placed at Q, with $q_B=f_B$ good focus should result, because aberrations introduced by A are compensated for by B. If $q_B>p_A$, we can then achieve magnification with sharp focus.

As illustrated in Fig. 11, an infinitesimal bundle leaving P for a small region about O gets focussed at $Q_0$. It can be shown that the ray PO' hits the principal reflected ray $OQ_0$ beyond $Q_0$ (at Q') after reflection, and the ray PO'' hits $OQ_0$ before $Q_0$ (at Q'') after reflection and that the intersection of O''Q'' and O'Q' occurs at a point G just a little beyond Q''. All of this follows directly from the law of reflection. Relative to the principal ray $OQ_0$, we can say that O''Q'' has experienced more deviation and O'Q' less deviation. The effect of the second mirror of Fig. 10 is to interchange the roles of more and less deviation for the rays, with resultant improvement in the sharpness of focus.

*Anamorphotism*

The final image suffers from a discrepancy in the H and V magnification (anamorphotism). This is easily explained and not so easily remedied.

Figure 12:
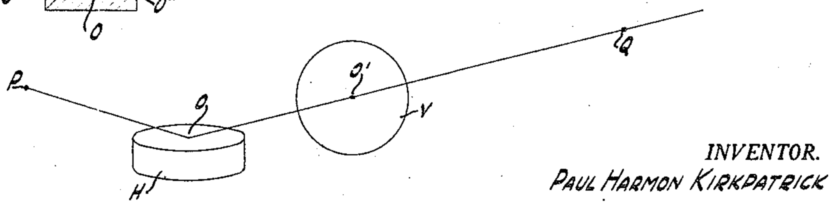
Fig. 12 is a diagram illustrative of the inequality of the magnification effected by the two mirrors of a single X-ray reflecting system.

In Fig. 12, let $$PO=p_H \qquad PO'=p_v \qquad M_H=\frac{q_H}{p_H}$$

$$OQ=q_H \qquad O'Q=q_v \qquad M_V=\frac{q_V}{p_v}$$

Q is the location of the final image after reflection from both mirrors. It is at once apparent that $$M_H>M_v$$

That is, the magnification in the H direction is greater than in the V direction. For this and other reasons, it will be advantageous to reduce the diameter of the mirrors and make OO' as small as possible.

Figure 13:
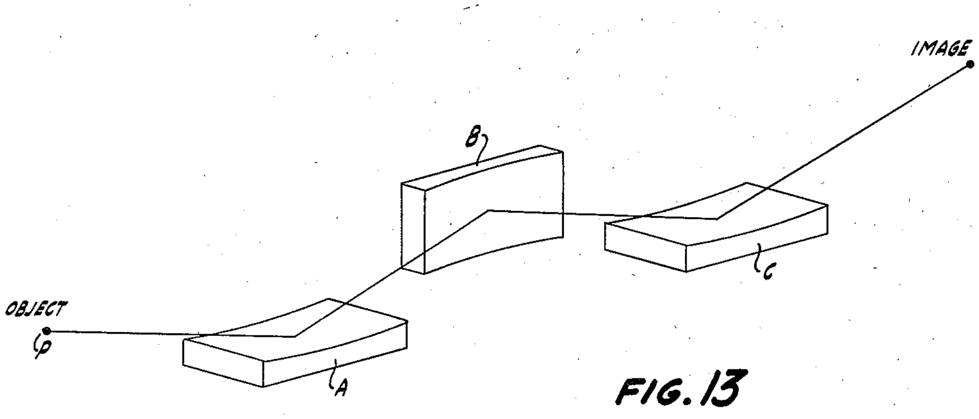
Fig. 13 is a diagram of a multiple reflecting system by which a magnified X-ray image substantially free of anamorphotism can be obtained.

However, by using a multiple system such as illustrated in Fig. 13, the final magnifications can be made equal. As shown in this figure, three "crossed" mirrors A, B and C are resorted to. The H magnification is effected by the mirror B, while the V magnification results from the combined action of mirrors A and C. Let $d$ equal the distance between mirrors A and C. Let $f$=the focal length of the mirror A=the focal distance of the mirror C. Let $p$=the distance from the object P, to A. Then it can be shown that the desired result is obtained by making the focal length of the mirror B equal to:

$$\frac{f(2p+d)}{2(2p+d-dp/f)}$$

*Physical details of system*

Although the details of design and construction of an X-ray system such as above described are not here involved it should be noted that in any instrument built for this purpose provision should be made for the rotation of the mirrors so as to permit of the adjustment of the angle of incidence and for the longitudinal movement of the mirrors relative to each other and to the film and X-ray source so that the images can be brought into proper focus.

*Elliptical and parabolic reflectors*

As a result of the focal properties of an ellipse it is theoretically possible to image a point object as a point image by the use of a mirror in the form of a portion of a single ellipsoid of revolution in place of a system involving two or more circular or spherical mirrors. Mathematically it can be shown that for practical purposes the major axis of such an ellipsoid would have to be about one hundred times longer than its minor axis. Obviously, a reflector of this character would be very difficult to make, and furthermore would be somewhat impractical because of aberrations inherently resulting from its use in a single mirror system for producing a point image of a point object.

However, by using a mirror having an elliptical profile, the spherical (or more properly, circular) aberration resulting from the use of circular or spherical mirrors can be avoided.

Futhermore, it should be noted that a parabolic mirror can be used advantageously for producing a parallel beam of X-rays or gamma rays by simply locating the source of X-rays at the focus of the parabola.

*Resolving power*

Photographs taken with systems of the type above described indicate a resolving power in the order of 500 lines per mm. In other words, two objects separated by a distance of 2,000 Å. can be resolved. It can be shown that the theoretical upper limit of the resolving power of combinations of elliptical or parabolic mirror systems is about 70 Å.

*Mirror coatings*

For optimum results, the character of the coating applied to the mirrors should be such that the grazing angle $\delta$ is as large as possible. An element of high atomic number and high density, such as platinum, is therefore indicated.

*Physical details of X-ray imaging reflector*

Figure 14:
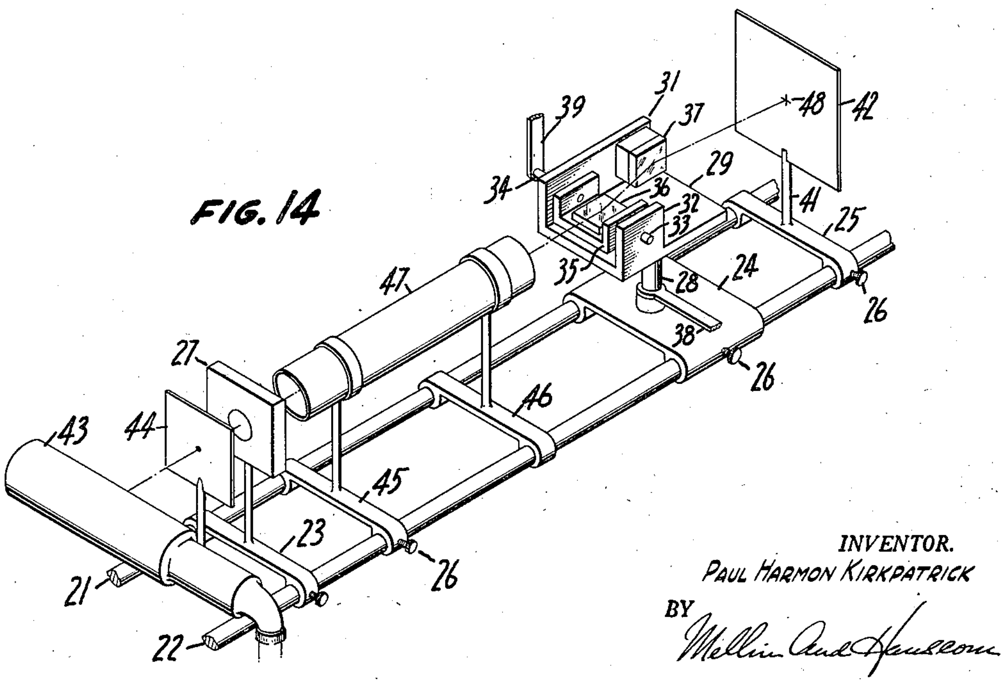
Fig. 14 is an isometric projection of an X-ray reflecting machine embodying the invention.

From the standpoint of equipment, the systems above discussed may be embodied in an instrument of the character illustrated in Fig. 14, and which includes a pair of parallel rails 21 and 22 forming part of, or arranged to be mounted over, an optical bench. Mounted on these rails are slides 23, 24 and 25, each provided with a set screw 26 for securing it in any desired position along the rails. Formed integral with and upstanding from the slide 23 is an object-holder 27, in which may be mounted any object such as a wire mesh screen. Mounted centrally on the slide 24 for rotation on a vertical axis is a stub shaft 28 and fixed to the upper end of this shaft is a primary mirror holder 29 provided with upstanding side walls 31 and 32. Pivoted to the side walls 31 and 32 on a pair of axially aligned stems 33 and 34 is a secondary mirror holder 35. Supported on this secondary holder in a substantially horizontal position, is a concave mirror 36 and mounted on the side wall 31 of the primary mirror holder 29 in a substantially vertical position, is a second concave mirror 37. Fixed to the shaft 28 is a lever 38 by which the angular position of the primary holder 29 and consequently the mirror 37 may be adjusted as desired. Similarly fixed to the stem 34 is a lever 39 by which the secondary mirror holder 35 and its mirror 36 may be tilted. In this connection it is to be observed that there is sufficient friction between the pin 34 and the side 31 to hold the secondary mirror holder 35 in any desired adjusted position. Since the mirror 36 merely rests on its support 35, it can be adjusted longitudinally as desired. Upstanding from the slide 25 is a pedestal 41 serving as a support for an X-ray detector 42 such as a sensitized plate or a fluorescent screen. Mounted to the rear of the object-holder 27 is an X-ray tube 43 which in accordance with usual practice should of course be encased in a lead housing, and the target of which is in alignment with the two mirrors 36 and 37. Slidably mounted on the rails 21 and 22 between the X-ray tube 43 and the object-holder 27 is a diaphragm 44.

Copper and tungsten X-rays emerging from glass tube windows have been found suitable for the purpose of making X-ray images in accordance with my invention. The wave lengths of the reflected radiation have been of the order of 1 Å. In this connection it is to be noted that longer waves have many advantages, for the resulting increased critical angle of reflection will reduce image aberration, tend to rectify the obliquity of field, accommodate larger objects, and improve light-gathering power. Furthermore, surface irregularities will diminish in importance as the wave length increases.

Since the absorption of X-ray radiation by air becomes serious when wave lengths longer than 1.5 Å. are used, it is preferable to replace the air path by tubes containing hydrogen or helium, and to this end a helium tube 47 is mounted on slides 45 and 46, between the object holder 27 and the two mirrors 36 and 37.

By resorting to an instrument of this character, all of the adjustments required to bring the image 48 into substantial focus on the detector 42 readily can be made.

*Conclusion*

In conclusion, it should be noted that the short wave radiation reflecting systems herein described are not only of use in producing images of objects not readily penetrated by light and electrons, but are also useful for such purposes as illuminating crystals for the observation of Bragg reflection and for making measurements of the wave lengths of X-ray characteristic lines by an extension of the Rowland grating principle. Furthermore, the convergence of X-ray beams may prove to be of considerable value in connection with X-ray therapy.

*Definitions*

As herein used the term:

1. Cylindrical denotes a circular cylinder;
2. Used profile denotes the profile of a mirror taken in the general direction of the principal ray of a reflecting system such as herein described;
3. Conic section mirror denotes a mirror the "used" profile of which takes the form of a conic section;
4. Circular mirror denotes a mirror the "used" profile of which is circular;
5. Elliptical mirror denotes a mirror the "used" profile of which is elliptical;
6. Parabolic mirror denotes a mirror the "used" profile of which is parabolic;
7. Single system denotes a reflecting system wherein only two "crossed" mirrors are used;
8. Multiple system denotes a reflecting system wherein three or more "crossed" mirrors are used.
9. Detector denotes any device such as a film, plate or screen for detecting X-rays or gamma rays.

I claim:

1. An X-ray or gamma ray imaging system comprising: means providing a bundle of said rays; a concave mirror positioned with its concave surface at grazing incidence to the path of said bundle of rays; and at least one further concave mirror positioned with its concave surface at grazing incidence to the path of the rays reflected from said first mirror and with the plane tangent to the surface of the second mirror at the point of incidence of the axis of the bundle of rays substantially perpendicular to the corresponding plane tangent to the surface of the first mirror.

2. An X-ray or gamma ray imaging system as defined in claim 1 wherein at least one of said concave mirrors is spherical.

3. An X-ray or gamma ray imaging system comprising: means providing a bundle of said rays; a concave mirror positioned with its concave surface at grazing incidence to the path of said bundle of rays; at least one further concave mirror positioned with its concave surface at grazing incidence to the path of the rays reflected from said first mirror and with the plane tangent to the surface of the second mirror at the point of incidence of the axis of the bundle of rays substantially perpendicular to the corresponding plane tangent to the surface of the first mirror; and means for positioning a detector for said rays in the path of the rays reflected from said further mirror or mirrors.

4. An X-ray or gamma ray imaging system comprising: means providing a bundle of said rays; means for positioning an object in the path of said bundle of rays; a concave mirror positioned with its concave surface at grazing incidence to the path of those rays of said bundle which pass by or through said object; at least one further concave mirror positioned with its concave surface at grazing incidence to the path of the rays reflected from said first mirror and with the plane tangent to the surface of the second mirror at the point of incidence of the axis of the bundle of rays substantially perpendicular to the corresponding plane tangent to the surface of the first mirror; and means for positioning a detector for said rays in the path of the rays reflected from said further mirror or mirrors.

PAUL HARMON KIRKPATRICK.

REFERENCES CITED

The following references are of record in the file of this patent:

UNITED STATES PATENTS

| Number | Name | Date |
|---|---|---|
| 1,626,306 | St. John | Apr. 26, 1927 |
| 1,865,441 | Mutscheller | July 5, 1932 |
| 2,418,029 | Hillier | Mar. 25, 1947 |
| 2,428,796 | Friedman | Oct. 14, 1947 |
| 2,452,045 | Friedman | Oct. 26, 1948 |

FOREIGN PATENTS

| Number | Country | Date |
|---|---|---|
| 506,022 | Great Britain | May 22, 1939 |

OTHER REFERENCES

Focusing X-Ray Monochromators, by C. S. Smith, Review of Scientific Instruments, June 1941, pp. 312–314.

X-Rays and Electrons, by A. H. Compton, 1926, D. Van Nostrand Co., New York, pp. 215–217.